United States Patent
Rhoads

(10) Patent No.: US 7,966,494 B2
(45) Date of Patent: Jun. 21, 2011

(54) VISUAL CONTENT-BASED INTERNET SEARCH METHODS AND SUB-COMBINATIONS

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 969 days.

(21) Appl. No.: 11/620,993

(22) Filed: Jan. 8, 2007

(65) Prior Publication Data

US 2008/0028223 A1      Jan. 31, 2008

Related U.S. Application Data

(62) Division of application No. 09/476,686, filed on Dec. 30, 1999, now Pat. No. 7,562,392.

(60) Provisional application No. 60/134,782, filed on May 19, 1999.

(51) Int. Cl.
*H04L 9/00*         (2006.01)

(52) U.S. Cl. .................................... 713/176; 726/26

(58) Field of Classification Search ............... 380/54; 713/167, 176, 187, 189; 726/26; 705/57–59; 382/100

See application file for complete search history.

(56) References Cited

U.S. PATENT DOCUMENTS

| | | | |
|---|---|---|---|
| 5,613,004 A | 3/1997 | Cooperman et al. | |
| 5,761,606 A | 6/1998 | Wolzien | |
| 5,761,686 A | 6/1998 | Bloomberg | |
| 5,774,452 A | 6/1998 | Wolosewicz | |
| 5,873,077 A | 2/1999 | Kanoh et al. | |
| 5,892,900 A * | 4/1999 | Ginter et al. | 726/26 |
| 5,902,353 A | 5/1999 | Reber et al. | |
| 5,905,800 A | 5/1999 | Moskowitz et al. | |
| 5,913,205 A | 6/1999 | Jain et al. | |
| 5,913,210 A | 6/1999 | Call | |
| 5,918,223 A | 6/1999 | Blum et al. | |
| 5,932,863 A | 8/1999 | Rathus | |
| 5,933,829 A | 8/1999 | Durst et al. | |
| 5,938,727 A | 8/1999 | Ikeda | |
| 5,963,957 A | 10/1999 | Hoffberg | |
| 5,974,409 A | 10/1999 | Sanu | |
| 5,978,773 A | 11/1999 | Hudetz et al. | |
| 5,986,651 A | 11/1999 | Reber et al. | |
| 6,005,501 A | 12/1999 | Wolosewicz | |
| 6,035,055 A * | 3/2000 | Wang et al. | 382/118 |
| 6,064,979 A | 5/2000 | Perkowski | |
| 6,098,106 A | 8/2000 | Philyaw et al. | |
| 6,121,530 A | 9/2000 | Sonoda | |
| 6,122,403 A | 9/2000 | Rhoads | |

(Continued)

FOREIGN PATENT DOCUMENTS

WO      WO 97/43736      11/1997

(Continued)

OTHER PUBLICATIONS

Barrett, "Informative Things: How to Attach Information to the Real World," ACM Symposium on User Interface Software and Technology, Nov. 1, 1998.

Digimarc, "Frequently Asked Questions About Digimarc Signature Technology," 9 pp., Aug. 1995.

Holmquist, Token-Based Access to Digital Information, Proc. 1st Int'l Symp. on Handheld and Ubiquitous Computing, Sep. 1999, pp. 234-245.

Ljungstrand, et al, WebStickers: Using Physical Objects as WWW Bookmarks, in Extended Abstracts of CHI 1999, 2 pp.

(Continued)

*Primary Examiner* — Hosuk Song

(57)       ABSTRACT

A camera-equipped portable device captures visual information (e.g., from a movie), ascertains a corresponding identifier, and uses the identifier to enable one or more further functions. One of these can be internet search. Such functionality can also be based on digital data—without requiring a camera capability.

31 Claims, 2 Drawing Sheets

U.S. PATENT DOCUMENTS

| | | | |
|---|---|---|---|
| 6,125,172 | A | 9/2000 | August et al. |
| 6,147,940 | A | 11/2000 | Yankowski |
| 6,188,010 | B1 | 2/2001 | Iwamura |
| 6,243,480 | B1 | 6/2001 | Zhao et al. |
| 6,243,713 | B1 | 6/2001 | Nelson et al. |
| 6,256,623 | B1 | 7/2001 | Jones |
| 6,282,362 | B1 | 8/2001 | Murphy et al. |
| 6,285,776 | B1 | 9/2001 | Rhoads |
| 6,286,036 | B1 | 9/2001 | Rhoads |
| 6,298,446 | B1 | 10/2001 | Schreiber |
| 6,304,523 | B1 | 10/2001 | Jones et al. |
| 6,311,182 | B1 | 10/2001 | Colbath et al. |
| 6,338,094 | B1 | 1/2002 | Scott et al. |
| 6,345,256 | B1 | 2/2002 | Milsted et al. |
| 6,356,761 | B1 | 3/2002 | Huttunen et al. |
| 6,377,927 | B1 | 4/2002 | Loghmani et al. |
| 6,389,055 | B1 | 5/2002 | August et al. |
| 6,421,070 | B1 | 7/2002 | Ramos |
| 6,442,285 | B2 | 8/2002 | Rhoads et al. |
| 6,456,725 | B1 | 9/2002 | Cox et al. |
| 6,463,426 | B1 | 10/2002 | Lipson et al. |
| 6,493,457 | B1 | 12/2002 | Quackenbush |
| 6,505,160 | B1 | 1/2003 | Levy et al. |
| 6,510,234 | B1 | 1/2003 | Cox et al. |
| 6,522,769 | B1 | 2/2003 | Rhoads et al. |
| 6,526,449 | B1 | 2/2003 | Philyaw et al. |
| 6,535,889 | B1 | 3/2003 | Headrick |
| 6,542,882 | B1 | 4/2003 | Smith |
| 6,560,349 | B1 | 5/2003 | Rhoads |
| 6,611,607 | B1 | 8/2003 | Davis et al. |
| 6,640,306 | B1 | 10/2003 | Tone et al. |
| 6,650,761 | B1 | 11/2003 | Rodriguez et al. |
| 6,674,993 | B1 | 1/2004 | Tarbouriech |
| 6,678,680 | B1 | 1/2004 | Woo |
| 6,804,376 | B2 | 10/2004 | Rhoads et al. |
| 6,829,368 | B2 | 12/2004 | Rhoads et al. |
| 6,839,705 | B1 | 1/2005 | Grooters |
| 6,850,626 | B2 | 2/2005 | Rhoads et al. |
| 6,931,451 | B1 | 8/2005 | Logan et al. |
| 6,941,275 | B1 | 9/2005 | Swierczek |
| 6,965,682 | B1 | 11/2005 | Davis et al. |
| 6,999,959 | B1 | 2/2006 | Lawrence et al. |
| 7,051,019 | B1 | 5/2006 | Land et al. |
| 7,084,903 | B2 | 8/2006 | Narayanaswami et al. |
| 7,171,018 | B2 | 1/2007 | Rhoads et al. |
| 7,174,293 | B2 | 2/2007 | Kenyon et al. |
| 7,185,201 | B2 | 2/2007 | Rhoads et al. |
| 7,233,948 | B1 | 6/2007 | Shamoon |
| 7,251,475 | B2 | 7/2007 | Kawamoto |
| 7,263,659 | B2 | 8/2007 | Hull |
| 7,284,255 | B1 | 10/2007 | Apel et al. |
| 7,301,944 | B1 | 11/2007 | Redmond |
| 7,302,574 | B2 | 11/2007 | Conwell et al. |
| 7,333,957 | B2 | 2/2008 | Levy et al. |
| 7,343,320 | B1 | 3/2008 | Treyz |
| 7,349,552 | B2 | 3/2008 | Levy et al. |
| 7,372,976 | B2 | 5/2008 | Rhoads et al. |
| 7,421,723 | B2 | 9/2008 | Harkness |
| 7,450,734 | B2 | 11/2008 | Rodriguez et al. |
| 7,502,490 | B2 | 3/2009 | Rhoads et al. |
| 7,505,605 | B2 | 3/2009 | Rhoads et al. |
| 7,545,951 | B2 | 6/2009 | Davis et al. |
| 7,562,392 | B1 | 7/2009 | Rhoads et al. |
| 7,565,294 | B2 | 7/2009 | Rhoads |
| 7,577,677 | B2 | 8/2009 | Collart |
| 7,587,602 | B2 | 9/2009 | Rhoads |
| 7,590,259 | B2 | 9/2009 | Levy et al. |
| 7,593,576 | B2 | 9/2009 | Meyer et al. |
| 7,602,940 | B2 | 10/2009 | Rhoads et al. |
| 7,640,186 | B1 | 12/2009 | Fraser et al. |
| 7,650,010 | B2 | 1/2010 | Levy et al. |
| 7,685,426 | B2 | 3/2010 | Ramos et al. |
| 7,711,564 | B2 | 5/2010 | Levy et al. |
| 2001/0044744 | A1 | 11/2001 | Rhoads |
| 2001/0053234 | A1 | 12/2001 | Rhoads |
| 2002/0004753 | A1 | 1/2002 | Perkowski |
| 2002/0033844 | A1 | 3/2002 | Levy et al. |
| 2002/0059162 | A1 | 5/2002 | Shinoda et al. |
| 2003/0011684 | A1 | 1/2003 | Narayanaswami et al. |
| 2003/0167173 | A1 | 9/2003 | Levy |
| 2003/0174861 | A1 | 9/2003 | Levy et al. |
| 2004/0128514 | A1 | 7/2004 | Rhoads |
| 2005/0022032 | A1 | 1/2005 | Zhao |
| 2005/0043018 | A1 | 2/2005 | Kawamoto |
| 2005/0058319 | A1 | 3/2005 | Rhoads |
| 2005/0091268 | A1 | 4/2005 | Meyer |
| 2005/0229107 | A1 | 10/2005 | Hull |
| 2007/0100757 | A1 | 5/2007 | Rhoads |
| 2007/0174059 | A1 | 7/2007 | Rhoads |
| 2007/0185840 | A1 | 8/2007 | Rhoads |
| 2007/0195987 | A1 | 8/2007 | Rhoads |
| 2007/0245400 | A1 | 10/2007 | Paek |
| 2007/0250194 | A1 | 10/2007 | Rhoads et al. |
| 2007/0250716 | A1 | 10/2007 | Rhoads et al. |
| 2008/0028223 | A1 | 1/2008 | Rhoads |
| 2008/0133416 | A1 | 6/2008 | Rhoads |
| 2008/0133556 | A1 | 6/2008 | Conwell et al. |
| 2008/0140573 | A1 | 6/2008 | Levy et al. |
| 2008/0307070 | A1 | 12/2008 | Roberts et al. |
| 2008/0319859 | A1 | 12/2008 | Rhoads |
| 2009/0177742 | A1 | 7/2009 | Rhoads et al. |
| 2010/0008586 | A1 | 1/2010 | Meyer et al. |
| 2010/0009722 | A1 | 1/2010 | Levy et al. |
| 2010/0036881 | A1 | 2/2010 | Rhoads et al. |
| 2010/0046744 | A1 | 2/2010 | Rhoads et al. |
| 2010/0138012 | A1 | 6/2010 | Rhoads |
| 2010/0150395 | A1 | 6/2010 | Davis et al. |
| 2010/0185306 | A1 | 7/2010 | Rhoads |

FOREIGN PATENT DOCUMENTS

| | | |
|---|---|---|
| WO | WO9743736 | 11/1997 |
| WO | WO9904561 | 1/1999 |
| WO | WO9953428 | 10/1999 |
| WO | WO 00/36605 | 6/2000 |
| WO | WO 00/79709 | 12/2000 |

OTHER PUBLICATIONS

Perrig et al, Digital Image Watermarking in the Real World, Mar. 9, 1998.

Rekimoto, "Augment-able Reality: Situation Communication through Physical and Digital Spaces," Prc. Of 2d Int. Symp. On Wearable Computers, Oct. 1998.

Ullmer, Models and Mechanisms for Tangible User Interfaces, MS Thesis, MIT, Jun. 1997, 83 pp.

Rejection dated Apr. 9, 2010 in U.S. Appl. No. 11/620,999, and applicant's responsive amendment of Jul. 9, 2010.

James C. Clemens, "A Conversational Interface to News Retrieval", submitted to Department of Electrial Engineering and Computer Science at the Massachusetts Institute of Technology on Aug. 9, 1996, 53 pages.

Ghias et al., "Query By Humming: Musical Information Retrieval in an Audio Database" ACM Multimedia, 11 pages, Nov. 1995.

U.S. Appl. No. 60/107,463, filed Nov. 6, 1998.

U.S. Appl. No. 60/118,020, filed Feb. 1, 1999.

Foote, "An Overview of Audio Information Retrieval," Multimedia Systems, v. 7 n. 1, pp. 2-10, 1999.

Smith, et al. "Music Information Retrieval Using Audio Input," Proc AAAI Spring Symposium on Intelligent Integration and Use of Text, Image, Video and Audio Corpora, 5 pages.

U.S. Appl. No. 09/337,590, filed Jun. 21, 1999, Geoffrey B. Rhoads.

U.S. Appl. No. 09/491,534, filed Jan. 26, 2000, Bruce L. Davis, et al.

U.S. Appl. No. 09/515,826, filed Feb. 29, 2000, Geoffrey B. Rhoads.

Blackburn, "A Tool for Content Based Navigation of Music," ACM Multimedia—Electronic Proceedings 1998, 14 pages.

De Roure, "Multiagent System for Content Based Navigation of Music," ACM Multimedia, Oct. 1999, 4 pages.

Roy, "Wearable Audio Computer—A Survey of Interaction Techniques," MIT Media Lab, 1997, 11 pages.

Prosecution history of U.S. Appl. No. 11/620,999 filed Jan. 8, 2007.

Alattar, Smart Images Using Digimarc's Watermarking Technology, Proc. SPIE, vol. 3971, 10 pages, 2000.

* cited by examiner

VISUAL CONTENT-BASED INTERNET SEARCH METHODS AND SUB-COMBINATIONS

RELATED APPLICATION DATA

This application is a division of application Ser. No. 09/476,686, filed Dec. 30, 1999 (now U.S. Pat. No. 7,562, 392), which claims priority benefit to provisional application 60/134,782, filed May 19, 1999. (Appendix A attached hereto is taken from the provisional application 60/134,782.)

The specification of the present application is essentially identical to that of a companion application filed by the same inventor on the same date, applicaton Ser. No. 11/620,999.

The technology detailed in the present application is also related to that detailed in application Ser. No. 09/343,104, filed Jun. 29, 1999 (now abandoned in favor of continuing application Ser. No. 10/764,430, filed Jan. 23, 2004); Ser. No. 09/292,569, filed Apr. 15, 1999 (now abandoned in favor of continuing application Ser. No. 10/379,393, filed Mar. 3, 2003, (now U.S. Pat. No. 7,263,203); Ser. No. 09/314,648, filed May 19, 1999 (now U.S. Pat. No. 6,681,028); 60/141, 763, filed Jun. 30, 1999; 60/158,015, filed Oct. 6, 1999; 60/163,332, filed Nov. 3, 1999; 60/164,619, filed Nov. 10, 1999; Ser. No. 09/452,023, filed Nov. 30, 1999 (now U.S. Pat. No. 6,408,082); Ser. No. 09/452,021, filed Nov. 30, 1999 (now U.S. Pat. No. 7,044,395); and in U.S. Pat. No. 5,862, 260.

INTRODUCTION 16 year old Bob struts into the coffee shop down from high school with a couple of buddies, a subtle deep pound in the ambient sound track lets them know they're in the right place. The three of them instinctually pull out of their pockets their audio Birddawgs (a small hand held unit about the size and style of an auto-door-alarm device, or "fob"), and when they see the tiny green light, they smile, high five, and push the big "GoFetch" button in synchrony. That tune will now be waiting for them at home, safely part of their preferred collection and ever-so-thankfully not lost to their collective bad memory (if they even knew the name of the artist and tune title in the first place!).

33 year old Mary is at home listening to the latest batch of holiday tunes being offered up over her 2-decade-long favorite radio station. She's spent many days now half-consciously culling the tunes for that perfect arrangement for the new year's bash that she regrettably agreed to host. 10:40 AM rolls around and some new tune catches her ear, a tune she knows can work well following the jingle-cats rendition of Strawberry Fields. She half jogs over to the stereo and hits the "GoFetch" button. In a few days, she'll sit down at the computer and put together the final sound track for the gala evening ahead, her play list dutifully waiting for her shuffling instructions and desired start time.

49 year old Jack (the financial analyst) is thoroughly bored sitting in the crowded gate D23 at Dulles. Droning 20 feet up and over his head is the airport network station, currently broadcasting the national weather report. As the segue to the business segment approaches, the teaser review mentions that they'll be having a report on today's rally in the bond market and the driving forces behind it. Jack pulls out his Birddawg-enabled Palm Pilot on the off-chance they actually will have a little depth in the reporting. Indeed, as the segment plays and starts discussing the convoluted effects of Greenspan's speech to the Internet-B-Free society, he taps the "GoFetch" button, knowing that once he gets back to his main browsing environment he will be able to follow dozens of links that the airport network has pre-assigned to the segment.

The foregoing and other features and advantages will be more readily apparent from the following detailed description, which proceeds with reference to the accompanying figures.

DETAILED DESCRIPTION

Figure 1:
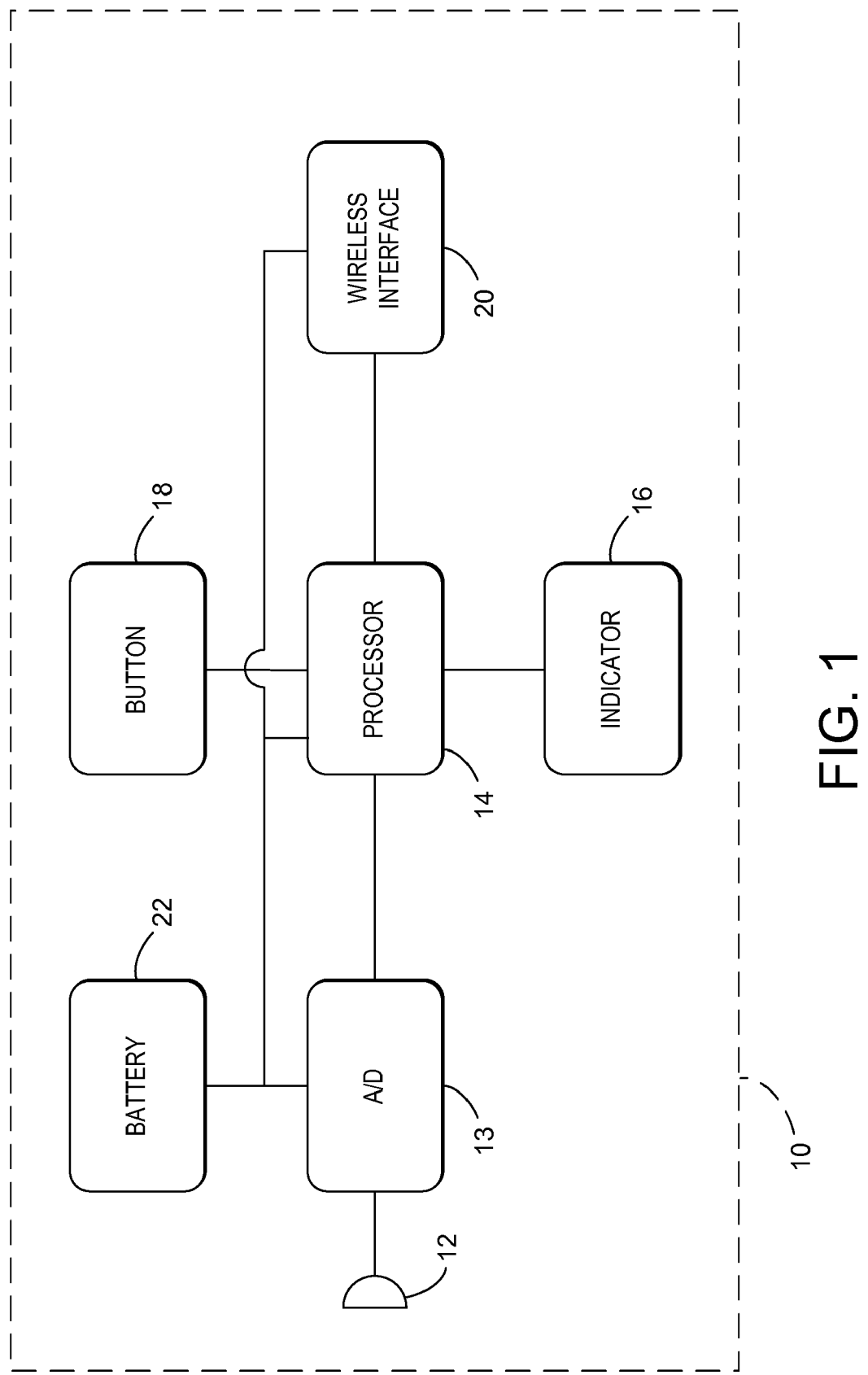
FIG. 1 is a block diagram of a device according to one embodiment.

Referring to FIG. 1, a device 10 according to one embodiment includes a microphone 12, an A/D converter 13, a processor 14, one or more indicators 16, one or more buttons 18, a wireless interface 20, and a power source 22.

The device can be packaged in a small plastic housing, preferably as small as is practical (e.g., sized and configured to serve as a key chain ornament, perhaps akin to the Tomagatchi toys that were recently popular). The housing has one or more small holes to permit audio penetration through the housing to the microphone 12.

The processor 14 can take various forms, including a dedicated hardware device (e.g., an ASIC), a general purpose processor programmed in accordance with instructions stored in non-volatile RAM memory, etc.

The indicators 16 can be as simple as a single LED lamp, or as complex as an alphanumeric LCD or other multi-element display. In one embodiment, the indicator simply indicates when the processor has decoded a watermark in audio sensed by the microphone. More elaborate signaling techniques can of course be used, including two- or three-color LEDs that can be used to signal different states with different colors, indicators with flashing patterns or changing displays, etc.

The buttons 18 are used by the user to indicate an interest in the audio just-heard. In one embodiment, there is a single button 18, and it is emblazoned with a stylized legend that can serve as a trademark or service mark, e.g., GetIt!, GoFetch, Birddawg, something Batman-esque ("Wham," "Zappp," "Pow!!," etc.), or something more mundane (e.g., Capture).

The power source 22 can be a battery, solar cell, storage capacitor, or other source of energy suitable for powering the components of the device 10.

Figure 2:
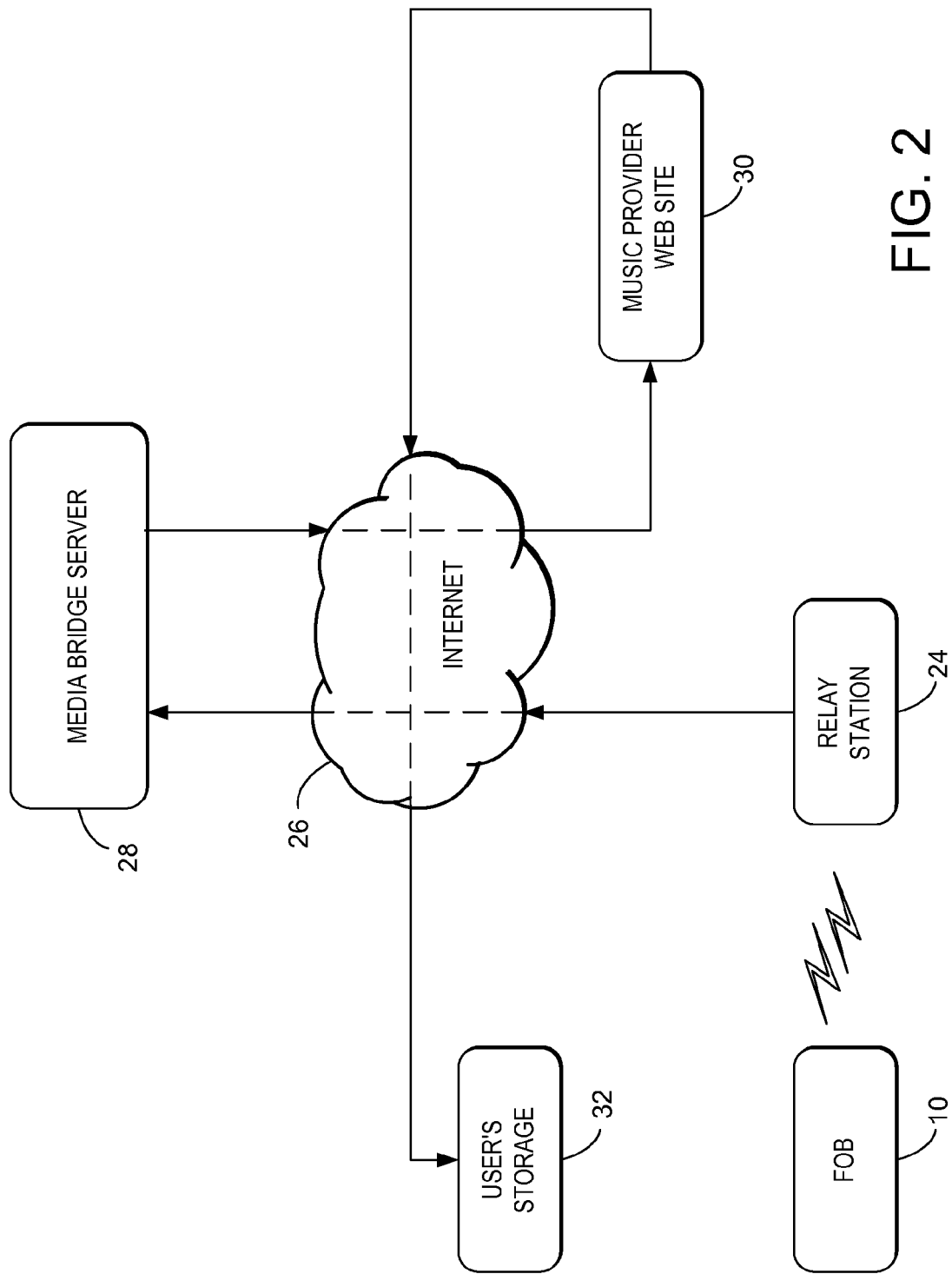
FIG. 2 is a block diagram of a system in which the device of FIG. 1 may be utilized.

The wireless interface 20 serves to exchange data with a relay station 24 (FIG. 2). In one embodiment, the interface is radio-based, and provides a one-way communications channel. In other embodiments other wireless technologies can be used (e.g., IR), and/or two-way communication can be provided.

The relay station can be a cellular repeater (if the interface transmits using cellular frequencies and protocols), or a local receiver, e.g., associated with the user's computer. The relay station can also be a paging system relay station (e.g., as are used for two-way pagers), or may be a low earth orbit satellite-based repeater.

In operation, the processor monitors the ambient audio for the presence of encoded data, e.g., a digital watermark, and decodes same. If power considerations permit, the device is "always-on." In other embodiments, one of the buttons 18 can be used to awaken the device. In such other embodiments, another button-press can serve to turn-off the device, or the device can power-down after a predetermined period, e.g., of not sensing any watermarked audio.

A number of techniques for watermarking audio (and decoding same) are known, as illustrated by U.S. Pat. Nos. 5,862,260, 5,963,909, 5,940,429, 5,940,135, 5,937,000, 5,889,868, 5,833,432, 5,945,932, WO9939344 (corresponding to U.S. application Ser. No. 09/017,145, now U.S. Pat. No. 6,145,081), and WO9853565 (corresponding to U.S. application Ser. Nos. 08/858,562 and 08/974,920, now U.S. Pat. Nos. 5,940,135 and 6,175,627, respectively). Commercially-available audio watermarking software includes that available from AudioTrack, Verance (formerly Aris/Solana), Cognicity, Liquid Audio, and others.

The data payload encoded by the watermark (the audio-ID) may take various forms. One is a Digital Object Identifier—an ID corresponding to the standardized digital object numbering system promulgated by the International DOI Foundation (www.doi.org). Another is to include plural data fields variously representing, e.g., the name of the publisher, the name of the artist, the title of the work, the date of publication, etc., etc. Another is to encode a unique identifier (UID), e.g., of 16-64 bits. The UID serves as an index to a remote database where additional information (e.g., publisher, artist, title, date of publication, etc., are stored).

The data transmitted from the device 10 to the relay station 24 typically includes some or all of the watermark payload data, and also includes data identifying the device 10, or its user (user-ID data). Again, this data can include several data fields (e.g. user name, audio delivery information such as email address or URL, age, gender, model of device 10, etc.). Alternatively, a serial number or other unique identifier can be used, which serves as an index to a database have a corresponding record of information relating to the user and/or device.

The audio-ID and user-ID data are typically formatted and encoded by the device 10 according to a protocol that provides error correcting, framing, and other data useful in assuring reliable transmission to the relay station, and/or for further transport.

Some embodiments of device 10 recognize just a single form of watermarking, and can understand only payload data presented in a single format. In other embodiments, the device may be capable of recognizing watermarking according to several different techniques, and with several different payload formats. This latter functionality can be achieved, e.g., by cyclically trying different decoding techniques until one that produces valid output data (e.g., by reference to a checksum or other indicia) is obtained. That decoding technique and payload interpretation can thereafter be used until valid output data is no longer obtained.

In some embodiments, the device 10 transmits data to the relay station at the moment the user presses the button 18. In other embodiments, a store-and-forward mode is used. That is, when the user presses the button 18, the decoded watermark data is stored in memory within the device. Thereafter, e.g., when the device is coupled with a "nest" or "holster" at the user's computer (or when download capability is otherwise activated), the stored data is downloaded—either through that device or otherwise.

The infrastructure between the device 10 and delivery of the audio to its ultimate destination can take myriad forms. One is shown in FIG. 2. In this arrangement, some or all of the data received by the relay station 24 is routed through the internet 26 to a server 28. (The server 28 can be a "MediaBridge" server of the type described, e.g., in the assignee's applications 60/164,619, filed Nov. 10, 1999, and Ser. No. 09/343,104, filed Jun. 29, 1999.) Server 28 parses the data and routes some or all of it to a data repository 30 at which the audio requested by the user is stored. This repository, in turn, dispatches the audio to the user (e.g., to a computer, media player, storage device, etc.), again through the internet. (Address information detailing the destination 32 of the audio may be included in the data sent from the device 10, or can be retrieved from a database at the server 28 based on a user-ID sent from the device 10.)

In some embodiments, the repository 30 (which may be co-located with server 28, or not) includes various data beyond the audio itself. For example, the repository can store a collection of metadata (e.g., XML tags) corresponding with each stored item of audio. This metadata can be transmitted to the user's destination 32, or can be used, e.g., for rights management purposes (to limit the user's reproduction or re-distribution rights for the audio, etc.), to establish a fee for the audio, etc. One suitable metatag standard is that under development by <indecs> (Interoperability of Data in E-Commerce Systems, www.indecs.org).

The audio data can be delivered in streaming form, such as using technology available from RealNetworks (RealAudio), Microsoft (Windows Media Player), MP3, Audiobase, Beatnik, Bluestreak.com, etc. The former three systems require large (e.g., megabytes) player software on the receiving (client) computer; the latter do not but instead rely, e.g., on small Java applets that can be downloaded with the music.

Alternatively, the audio can be delivered in a file format. In some embodiments the file itself is delivered to the user's destination 32 (e.g., as an email attachment). In others, the user is provided a URL to permit access to, or downloading of, the audio. (The URL may be a web site that provides an interface through which the user can pay for the requested music, if pre-payment hasn't been arranged.)

The user's destination 32 is typically the user's own computer. If a "live" IP address is known for that computer (e.g., by reference to a user profile database record stored on the server 28), the music can be transferred immediately. If the user's computer is only occasionally connected to the internet, the music can be stored at a web site (e.g. protected with a user-set password), and can be downloaded to the user's computer whenever it is convenient.

In other embodiments, the destination 32 is a personal music library associated with the user. The library can take the form, e.g., of a hard-disk or semiconductor memory array in which the user customarily stores music. This storage device is adapted to provide music data to one or more playback units employed by the user (e.g. a personal MP3 player, a home stereo system, a car stereo system, etc.). In most installations, the library is physically located at the user's residence, but could be remotely sited, e.g. consolidated with the music libraries of many other users at a central location.

The personal music library can have its own internet connection. Or it can be equipped with wireless capabilities, permitting it to receive digital music from wireless broadcasts (e.g. from a transmitter associated with the server 28). In either case, the library can provide music to the user's playback devices by short-range wireless broadcast.

In many embodiments, technology such as that available from Sonicbox, permits audio data delivered to the computer to be short range FM-broadcast by the user's computer to nearby FM radios using otherwise-unused radio spectrum.

Some implementations support several different delivery technologies (e.g., streaming, file, URL), and select among them in accordance with the profiles of different users.

Payment for the audio (if needed) can be accomplished by numerous means. One is by charging of a credit card account associated with the user (e.g., in a database record corresponding to the user-ID).

Some implementations make use of secure delivery mechanisms, such as those provided by InterTrust, Preview Systems, etc. In addition to providing secure containers by which the audio is distributed, such systems also include their own secure payment facilities.

By such arrangements, a user can conveniently compile an archive of favorite music—even while away from home.

To provide a comprehensive disclosure without unduly lengthening this specification, the disclosures of the applications and patents cited above are incorporated herein by reference.

Having described and illustrated the principles of my technological improvements with reference to a preferred embodiment and several variations thereof, it should be apparent that the detailed embodiments are illustrative only and should not be taken as limiting the scope of my work.

For example, while the foregoing is illustrated with reference to a button that is activated by the user to initiate capture of an audio selection, other interfaces can be used. For example, in some embodiments it can be a voice-recognition system that responds to spoken commands, such as "capture" or "record." Or it can be a form of gesture interface.

Likewise, while the foregoing is illustrated with reference to a stand-alone device, the same functionality can be built-into radios (including internet-based radios that receive wireless IP broadcasts), computer audio systems, and other appliances. In such case the microphone can be omitted and, in some cases, the wireless interface as well. (The data output from the device can be conveyed, e.g., through the network connection of an associated computer, etc.)

Moreover, while the foregoing is illustrated with reference to an embodiment in which audio, alone, is provided to the user, this need not be the case. As in the Dulles airport scenario in the introduction, the server 28 can provide to the user several internet links associated with the sensed audio. Some of these links can provide commerce opportunities (e.g., to purchase a CD on which the sensed audio is recorded). Others can direct the user to news sites, concert schedules, fan-club info, etc. In some such embodiments, the ancillary information is provided to the user without the audio itself.

Although not particularly detailed, the data provided to the user's destination typically includes information about the context in which the data was requested. In a simple case this can be the time and date on which the user pressed the Capture button. Other context information can be the identification of other Birddawg devices 10 that were nearby when the Capture button was pressed. (Such information can be gleaned, e.g., by each device transmitting a brief WhoAmI message periodically, receiving such messages from other nearby devices, and logging the data thus received.)

Still other context information might be the location from which the Capture operation was initiated. This can be achieved by decoding of a second watermark signal, e.g., on a low level white-noise broadcast. The public address system in public places, for example, can broadcast a generally-indiscernable noise signal that encodes a watermark signal. Devices 10 can be arranged to detect two (or more) watermarks from the same audio stream, e.g., by reference to two pseudo-random sequences with which the different watermarks are encoded. One identifies the audible audio, the other identifies the location. By such an arrangement, for example, the device 10 can indicate to the server 28 (and thence to the user destination 32) the location at which the user encountered the audio. (This notion of providing location context information by subliminal audio that identifies the location has powerful applications beyond the particular scenario contemplated herein.)

In some embodiments, the device 10 can buffer watermark information from several previous audio events, permitting the user to scroll back and select (e.g., in conjunction with a screen display 16) the ID of the desired audio.

An arrangement like the foregoing may require that the decoded watermark information be interpreted for the user, so that the user is not presented simply a raw binary watermark payload. The interpreted information presented to the user can comprise, e.g., the source (CNN Airport News, WABC Radio, CD-ROM, MTV), the artist (Celine Dion), the title (That's the Way It Is), and/or the time decoded (3:38:02 p.m.), etc.

One way to achieve the foregoing functionality is to convey both the binary UID payload and abbreviated text (e.g., 5- or 6-bit encoded) through the watermark "channel" on the audio. In one such arrangement, the watermark channel conveys data a UID, four characters of text, and associated error-correcting bits, every ten seconds. In the following ten seconds the same UID is conveyed, together with the next four characters of text.

Another way to achieve such functionality is to provide a memory in the device 10 that associates the watermark payload (whether UID or field-based) with corresponding textual data (e.g., the source/artist/title referenced above). A 1 megabyte semiconductor non-volatile RAM memory, for example, can serve as a look-up table, matching code numbers to artist names and song titles. When the user queries the device to learn the identify of a song (e.g., by operating a button 18), the memory is indexed in accordance with one or more fields from the decoded watermark, and the resulting textual data from the memory (e.g. source/artist/title) is presented to the user.

Such a memory will commonly require periodic updating. The wireless interface 20 in device 10 can include reception capabilities, providing a ready mechanism for providing such updated data. In one embodiment, the device "awakens" briefly at otherwise idle moments and tunes to a predetermined frequency at which updated data for the memory is broadcast, either in a baseband broadcast channel, or in an ancillary (e.g. SCA) channel.

In variants of the foregoing, internet delivery of update data for the memory can be substituted for wireless delivery. For example, a source/artist/title memory in the device 10 can be updated by placing the device in a "nest" every evening. The nest (which may be integrated with a battery charger for the appliance) can have an internet connection, and can exchange data with the device by infrared, inductive, or other proximity-coupling technologies, or through metal contacts. Each evening, the nest can receive an updated collection of source/artist/title data, and can re-write the memory in the device accordingly. By such arrangement, the watermark data can always be properly interpreted for presentation to the user.

The "Capture" concepts noted above can be extended to other functions as well. One is akin to forwarding of email. If a consumer hears a song that another friend would enjoy, the listener may send a copy of the song to the friend. This instruction can be issued by pressing a "Send" button, or by invoking a similar function on a graphical (or voice- or gesture-responsive) user interface. In response, the device so-instructed can query the person as to the recipient. The person can designate the desired recipient(s) by scrolling through a pre-stored list of recipients to select the desired one. (The list can be entered through a computer to which the device is coupled.) Alternatively, the user can type-in a name (if the device provides a keypad), or a portion thereof sufficient to uniquely identify the recipient. Or the person may speak the recipient's name. As is conventional with hands-free vehicle cell phones, a voice recognition unit can listen to the spoken instructions and identify the desired recipient. An "address book"-like feature has the requisite information for the recipient (e.g., the web site, IP address, or other data identifying the location to which music for that recipient should stored or queued, the format in which the music should be delivered, etc.) stored therein. In response to such command, the appliance dispatches instructions to the server 28, including an authorization to incur any necessary charges (e.g., by debiting the sender's credit card). Again, the server 28 attends to delivery of the music in a desired manner to the specified recipient.

Still further, a listener may query the device (by voice, GUI or physical button, textual, gesture, or other input) to identify CDs on which the ambient audio is recorded. Or the listener may query the device for the then-playing artist's concert schedule. Again, the appliance can contact a remote database and relay the query, together with the user ID and audio ID data. The database locates the requested data, and presents same to the user—either through a UI on device 10, or to the destination 32. If desired, the user can continue the dialog with a further instruction, e.g., to buy one of the CDs on which the then-playing song is included. Again, this instruction may be entered by voice, GUI, etc., and dispatched from the device to the server, which can then complete the transaction in accordance with pre-stored information (e.g. credit card account number, mailing address, etc.). A confirming message can be relayed to the device 10 or destination 32 for presentation to the user.

While the foregoing particularly contemplates audio, the principles detailed above find applications in many other media, and in many other applications of the MediaBridge server 28.

Moreover, while the foregoing particularly contemplates watermarks as the channel by which audio is identified, in other embodiments different techniques can be used. For example, digital radio protocols provide ID fields by which audio can be identified. Similarly, IP protocols for internet delivery of radio include identification fields within their packet formats. Accordingly, audio distributed according to formats that include audio IDs therein can likewise be employed.

Accordingly, I claim all such modifications as may fall within the scope and spirit of the following claims, and equivalents thereto.

I claim:

1. A method comprising:
   from a set of image data, decoding, using a processor, a steganographically-encoded digital watermark embedded therein;
   by reference to the decoded watermark, identifying a physical object; and
   presenting a menu with at least two options including initiating a purchase transaction involving the identified object, and another of the options comprising initiating a search related to the identified object using a general purpose internet search engine.

2. The method of claim 1, that further comprising:
   locating, in a database, a data record corresponding to the decoded watermark; and
   by reference to information obtained from the data record, formulating the menu.

3. The method of claim 1, wherein the identifying a physical object comprises obtaining keyword data associated with the object.

4. The method of claim 1, wherein the presented menu is customized based on the identification of the object.

5. The method of claim 1, wherein one of the options comprises initiating a purchase of the physical object from an online retailer.

6. A method comprising:
   capturing visual data from entertainment content;
   providing the visual data to a processor;
   receiving from the processor an identifier corresponding to the visual data; and
   by reference to the received identifier, initiating a search using a general purpose internet search engine, wherein the search is initiated with a general purpose internet search engine without entry of text by a user.

7. The method of claim 6, further comprising performing an algorithmic operation on the provided visual data to produce the identifier corresponding thereto.

8. The method of claim 7, wherein performing the algorithmic operation comprises decoding steganographically-encoded digital watermark data from the visual data.

9. The method of claim 6, further comprising:
   by reference to the received identifier, ascertaining an identity of the entertainment content; and
   initiating a search using a general purpose internet search engine for information related to the identified content.

10. The method of claim 6, further comprising presenting a textual listing of results to a user.

11. The method of claim 6, further comprising:
    presenting a menu of options on a display of a portable wireless device, at least one of the options relating to search; and
    initiating the search in response to a selection of a search-related option from the menu.

12. The method of claim 6, wherein the capturing comprises capturing with a camera-equipped device.

13. The method of claim 6, wherein the capturing comprises capturing data from motion picture content.

14. A method comprising:
    capturing visual data from entertainment content;
    providing the visual data to a processor;
    receiving from the processor identification data corresponding to the visual data;
    in a database, locating a data record corresponding to the identification data;
    by reference to information obtained from the data record, determining options to be presented on a menu;
    presenting a menu, including the determined options, on a display of a portable wireless device, wherein at least one of the options relates to search; and
    initiating a search using a general purpose internet search engine in response to a selection of a search-related option from the menu, wherein the search is initiated with a general purpose internet search engine without entry of text by a user.

15. A method of internet search comprising:
    receiving an identifier corresponding to visual data;
    by reference to the identifier, ascertaining, using a processor, an identity of an entertainment content object; and
    initiating a search using a general purpose internet search engine for information related to the identified entertainment content object, wherein the search is initiated with a general purpose internet search engine without entry of text by a user.

16. The method of claim 15, further comprising:
    obtaining visual data; and
    ascertaining the identifier from the visual data.

17. The method of claim 16, wherein the ascertaining the identifier comprises decoding steganographically-encoded digital watermark data from the visual data.

18. The method of claim 16, wherein the obtaining comprises capturing with a camera-equipped device.

19. The method of claim 15, wherein the receiving comprises receiving a digital object identifier issued by a central organization which uniquely identifies an entertainment content object.

20. The method of claim 15, further comprising presenting a textual listing of results to a user.

21. The method of claim 15, wherein the ascertaining comprises accessing a store of metadata associated with the identifier, and obtaining data therefrom.

22. The method of claim 15, further comprising:
presenting a menu of options on a display of a portable wireless device, at least one of the options relating to search; and
initiating the search in response to a selection of a search-related option from the menu.

23. The method of claim 22, further comprising:
locating, in a database, a data record corresponding to the identifier; and
by reference to information obtained from the data record, determining options to be presented on the menu.

24. An apparatus comprising:
a processor configured to: decode, from a set of image data, a steganographically-encoded digital watermark; and
identify, by reference to the decoded watermark, a physical object; and
a display configured to present a menu with at least two options including initiating a purchase transaction involving the identified object, and another of the options comprising initiating a search related to the identified object using a general purpose internet search engine.

25. A computer-readable medium having instructions stored thereon that, if executed by a computing device, cause the computing device to perform operations comprising:
decoding, from a set of image data, a steganographically-encoded digital watermark embedded therein;
by reference to the decoded watermark, identifying a physical object; and
presenting a menu with at least two options including initiating a purchase transaction involving the identified object, and another of the options comprising initiating a search related to the identified object using a general purpose internee search engine.

26. An apparatus comprising:
a capture component configured to capture visual data from entertainment content;
a processor configured to:
derive from the visual data an identifier; and
by reference to the received identifier, initiate a search using a general purpose internet search engine, wherein the search is initiated with a general purpose internet search engine without entry of text by a user.

27. A computer-readable medium having instructions stored thereon that, if executed by a computing device, cause the computing device to perform operations comprising:
capturing visual data from entertainment content;
deriving from the visual data an identifier corresponding to the visual data; an
by reference to the received identifier, initiating a search using a general purpose internet search engine, wherein the search is initiated with a general purpose internet search engine without entry of text by a user.

28. An apparatus comprising:
a capture component configured to capture visual data from entertainment content;
a processor configured to:
derive identification data corresponding to the visual data;
locating, in a database, a data record corresponding to the identification data; and
by reference to information obtained from the data record, determining options to be presented on a menu;
a display configured to present a menu, comprising the determined options, wherein at least one of the options relates to search; and
the processor further configured to initiate a search using a general purpose internet search engine in response to a selection of a search-related option from the menu, wherein the search is initiated with a general purpose internet search engine without entry of text by a user.

29. A computer-readable medium having instructions stored thereon that, if executed by a computing device, cause the computing device to perform operations comprising:
capturing visual data from entertainment content;
deriving identification data corresponding to the visual data;
locating, in a database, a data record corresponding to the identification data;
by reference to information obtained from the data record, determining options to be presented on a menu;
presenting a menu, including the determined options, wherein at least one of the options relates to search; and
initiating a search using a general purpose internet search engine in response to a selection of a search-related option from the menu, wherein the search is initiated with a general purpose internet search engine without entry of text by a user.

30. An apparatus comprising:
a processor configured to:
receive an identifier corresponding to visual data;
by reference to the identifier, ascertain an identity of an entertainment content object; and
initiate a search using a general purpose internet search engine for information related to the identified entertainment content object, wherein the search is initiated with a general purpose internet search engine without entry of text by a user.

31. A computer-readable medium having instructions stored thereon that, if executed by a computing device, cause the computing device to perform operations comprising:
receiving an identifier corresponding to visual data;
by reference to the identifier, ascertaining an identity of an entertainment content object; and
initiating a search using a general purpose internet search engine for information related to the identified entertainment content object, wherein the search is initiated with a general purpose internet search engine without entry of text by a user.

* * * * *

UNITED STATES PATENT AND TRADEMARK OFFICE
CERTIFICATE OF CORRECTION

| | | |
|---|---|---|
| PATENT NO. | : 7,966,494 B2 | |
| APPLICATION NO. | : 11/620993 | |
| DATED | : June 21, 2011 | |
| INVENTOR(S) | : Rhoads | |

It is certified that error appears in the above-identified patent and that said Letters Patent is hereby corrected as shown below:

Page 2, item (56), under "Other Publications", in Column 2, Line 11, delete "Electrial" and insert -- Electrical --.

Column 1, line 8, delete "1999" and insert -- 1999, --.

Column 1, line 14, delete "applicaton" and insert -- application --.

Column 7, line 58, in Claim 2, delete "that further" and insert -- further --.

Column 8, line 53, in Claim 15, delete "search" and insert -- search, --.

Column 9, line 45, in Claim 25, delete "internee" and insert -- internet --.

Column 9, line 60, in Claim 27, delete "an" and insert -- and --.

Signed and Sealed this
First Day of November, 2011

David J. Kappos
*Director of the United States Patent and Trademark Office*